United States Patent
Jain et al.

(10) Patent No.: US 12,513,077 B2
(45) Date of Patent: Dec. 30, 2025

(54) DIVERSIFYING K-SHORTEST PATH COMPUTATION RESULTS FOR MULTIPLE VERTICES AS DESTINATION OR AS INCLUSION CONSTRAINT

(71) Applicant: Ciena Corporation, Hanover, MD (US)

(72) Inventors: Ankur Jain, Gurgaon (IN); Suvendu Kumar Barik, Bhubaneswar (IN)

(73) Assignee: Ciena Corporation, Hanover, MD (US)

( * ) Notice: Subject to any disclaimer, the term of this patent is extended or adjusted under 35 U.S.C. 154(b) by 41 days.

(21) Appl. No.: 18/640,349

(22) Filed: Apr. 19, 2024

(65) Prior Publication Data

US 2025/0286811 A1     Sep. 11, 2025

(30) Foreign Application Priority Data

Mar. 7, 2024 (IN) .............................. 202411016409

(51) Int. Cl.
*H04L 45/122* (2022.01)
(52) U.S. Cl.
CPC ................................. *H04L 45/122* (2013.01)
(58) Field of Classification Search
CPC ..................................................... H04L 45/122
See application file for complete search history.

(56) References Cited

U.S. PATENT DOCUMENTS

| | | | |
|---|---|---|---|
| 10,033,623 B2 | 7/2018 | Jain et al. | |
| 11,362,903 B2 | 6/2022 | Cherrington et al. | |
| 11,489,758 B1* | 11/2022 | Jain | H04L 45/24 |
| 11,582,135 B2 | 2/2023 | Jain et al. | |
| 11,743,169 B2 | 8/2023 | Jain et al. | |
| 2015/0256442 A1* | 9/2015 | Hu | H04L 45/12 370/254 |
| 2016/0112327 A1* | 4/2016 | Morris | H04L 47/127 398/45 |
| 2017/0331722 A1* | 11/2017 | Greenbaum | H04L 45/125 |
| 2021/0014125 A1* | 1/2021 | Takeshita | H04L 43/0882 |
| 2022/0180745 A1* | 6/2022 | Banaei-Kashani | G08G 1/096725 |
| 2022/0231938 A1* | 7/2022 | Jain | H04L 45/122 |
| 2023/0057874 A1 | 2/2023 | Jain et al. | |

* cited by examiner

*Primary Examiner* — Chris Parry
*Assistant Examiner* — Dixon F Dabipi
(74) *Attorney, Agent, or Firm* — Baratta Law PLLC; Lawrence A. Baratta, Jr.

(57) ABSTRACT

Systems and methods for diversifying k-shortest path computation results for multiple vertices as destination or as inclusion constraint include receiving a request for k paths, in a network from a source port at a source node to a node, wherein the node includes a plurality of ports; representing the network as a graph with vertices representing ports, edges representing connections between the ports, and with weights assigned to each of the edges; assigning a dummy destination vertex to connect to each of the plurality of ports and associated edges between each of the plurality of ports and the dummy destination vertex having a same weight; determining up to the k paths between the source port and the dummy destination vertex, and, subsequent to the determining each of the k paths, assigning a corresponding edge of the associated edges in each of the k paths a predetermined value.

20 Claims, 6 Drawing Sheets

DIVERSIFYING K-SHORTEST PATH COMPUTATION RESULTS FOR MULTIPLE VERTICES AS DESTINATION OR AS INCLUSION CONSTRAINT

FIELD OF THE DISCLOSURE

The present disclosure relates generally to path computation in networking. More particularly, the present disclosure relates to systems and methods for diversifying k-shortest path computation results for multiple vertices as destination or as inclusion constraint.

BACKGROUND OF THE DISCLOSURE

Path computation in networking includes determining a path from a source node to a destination node in a network, including intermediate nodes, links, etc., based on some criteria, constraints, metrics, etc., e.g., from node A to node Z. The network can be an optical network, finding a wavelength from the source to destination node. Further, the network can be a packet network, finding a path, route, tunnel, Segment Routing (SR) policy, etc. from the source to destination node. Further, path computation can be defined even more granular, namely determining a path from port 1 in the source node to reach port 2 in the destination node. Also, there can be so-called inclusion constraint which further limits the path computation, such a requirement to include node B, as well as ports 3, 4, etc. in the path. Two example algorithms typically used for path computation include Dijkstra's algorithm and Yen's algorithm. Dijkstra's algorithm is used to find the shortest path on a weighted graph, i.e., here the network is modeled as a graph with the nodes or ports being the vertices and the edges being the connections (links). Dijkstra's algorithm can be used to find the shortest path and Yen's algorithm can be used to determine k-shortest paths using the results from Dijkstra's algorithm. Specifically, Yen's algorithm explores deviations from the shortest path to derive additional paths, i.e., the k-shortest paths.

BRIEF SUMMARY OF THE DISCLOSURE

The present disclosure relates to systems and methods for diversifying k-shortest path computation results for multiple vertices as destination or as inclusion constraint. In the present disclosure, path computation is between vertices which are ports in the network, i.e., optical connections, packet ports, etc., and in which there is a requirement for a node as an inclusion constraint in the path computation. When the vertices are ports, the k-shortest paths tend to share the same vertex at the inclusion constraint, i.e., most or all of the k-shortest paths share the same port at the node being the inclusion constraint. However, it is desirable to have diverse vertices (ports) across the k-shortest paths, but the structure of Yen's algorithm does not tend to provide such results. This is based on the fact Yen's algorithm starts with a given shortest path and then finds deviations therefrom. To solve this issue, the present disclosure includes a modification in Yen's algorithm to change the costs when finding deviating paths, to ensure diversity in edges associated with a node that is an inclusion constraint.

In various embodiment, the present disclosure includes a method having steps, an apparatus or processing device configured to implement the steps, and a non-transitory computer-readable medium storing instructions that, when executed, cause one or more processors to implement the steps. The steps include receiving a request for k paths, k>1, in a network from a source port at a source node to a node, wherein the node includes a plurality of ports; representing the network as a graph with vertices representing ports including the source port and the plurality of ports, edges representing connections between the ports, and with weights assigned to each of the edges; assigning a dummy destination vertex to connect to each of the plurality of ports and associated edges between each of the plurality of ports and the dummy destination vertex having a same weight; and determining up to the k paths between the source port and the dummy destination vertex, and, subsequent to the determining each of the k paths, assigning a corresponding edge of the associated edges in each of the k paths a predetermined value, greater than the same weight.

The steps can further include removing the dummy destination vertex and the associated edges from the k paths to form k shortest paths having diversity across the plurality of ports at a destination node; and providing the k shortest paths in response to the request. In an embodiment, the node can be an intermediate node that is an inclusion constraint and the request further includes a destination port at a destination node, and wherein the steps can further include determining k paths from associated ports of the plurality of ports at the intermediate node to the destination port; and returning k shortest paths based on the k paths between the source port and the intermediate node and the k paths from associated ports of the plurality of ports at the intermediate node to the destination port. In another embodiment, the node is a destination node, such that the k paths include diversity across the plurality of ports at the destination node. The predetermined value can be at least an order of magnitude greater than the weights. The determining can utilize Yen's algorithm. The network can be an optical network, and the ports represent wavelength connections. The network can operate at one or more of Layers 1, 2, and 3, and the ports represent either Time Division Multiplexing (TDM) or packet connections. The steps can be implemented in a Path Computation Engine (PCE).

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for diversifying k-shortest path computation results for multiple vertices as destination or as inclusion constraint.

Network and Network Graph

Figure 1:
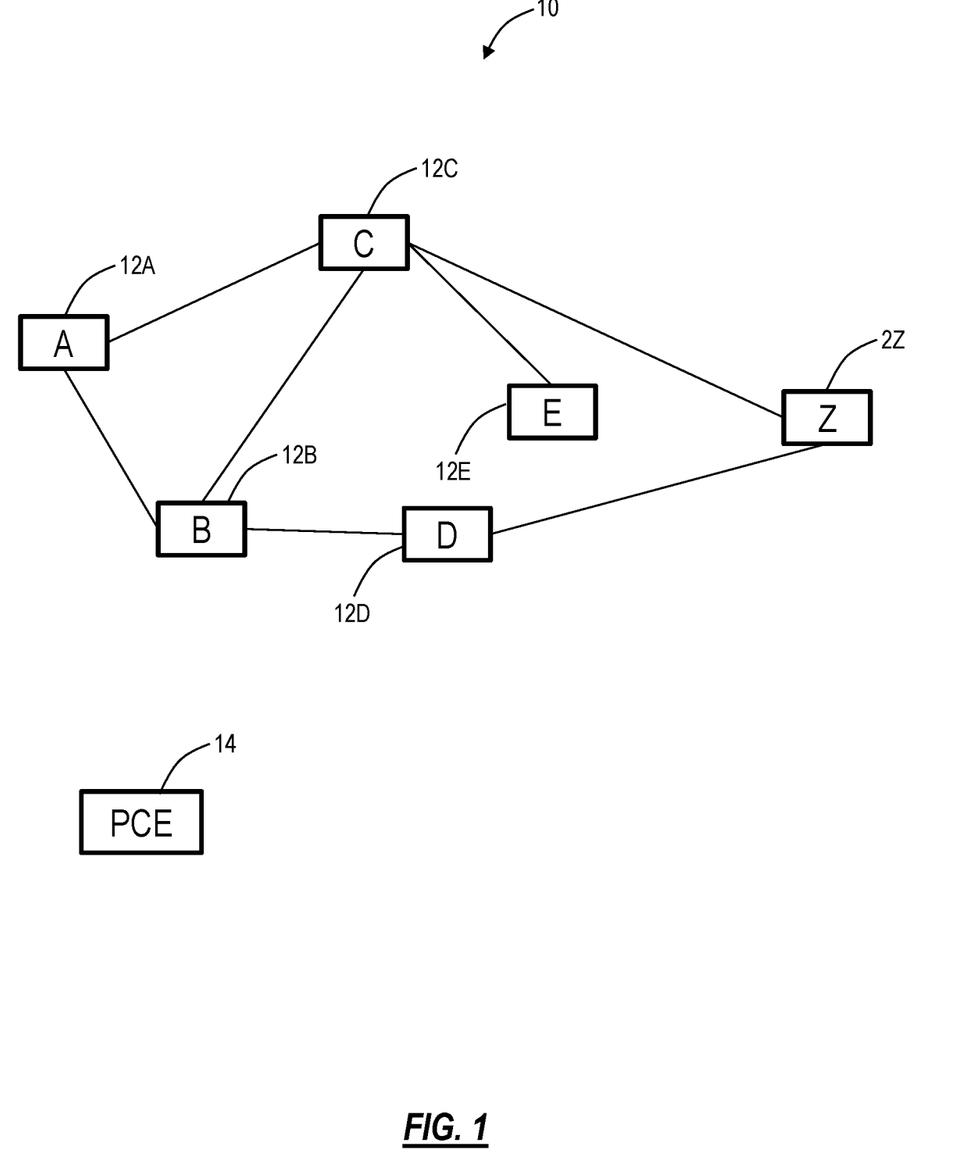
FIG. 1 is a network diagram of a network illustrating nodes and interconnectivity between the nodes.

FIG. 1 is a network diagram of a network 10 illustrating nodes 12A-12Z and interconnectivity between the nodes. The nodes 12A-12Z can be sites in the network and/or network elements at the sites. The network elements can be switches, routers, terminals, Optical Add/Drop Multiplexers (OADMs), Reconfigurable OADMs (ROADMs), or any other physical equipment which realizes network connectivity. The network 10 can provide connectivity at one or more network layers, including, e.g., optical (Layer 0), Time Division Multiplexing (TDM) (Layer 1), Packet (e.g., Ethernet, Multiprotocol Label Switching (MPLS), Segment Routing, etc.) (Layer 2), Internet Protocol (IP) (Layer 3), and the like. The nodes 12A-12Z include networking equipment for realizing connectivity at the one or more network layers. FIG. 1 is a high-level logical view of the network 10. Those skilled in the art will recognize the network elements are hardware devices that include multiple ports that provide the interconnectivity between the nodes.

There can also be a Path Computation Engine (PCE) 14 communicatively coupled to the network 10. The PCE 14 is a processing device that can support path computation, in addition to other functions. The official definition of a PCE is an entity (component, application, or network node) that is capable of computing a network path or route based on a network graph and applying computational constraints. Note, the PCE 14 can be a server, a cloud service, an application, a management system, a controller, etc. For example, the PCE 14 can be a standalone device. In another example, the PCE 14 can be included with a Network Management System (NMS), Software Defined Networking (SDN) controller, network orchestrator, a component in a network element, or the like. Those skilled in the art will recognize the techniques for path computation described herein contemplate operation anywhere and the PCE 14 is shown for illustration purposes only.

Figure 2:
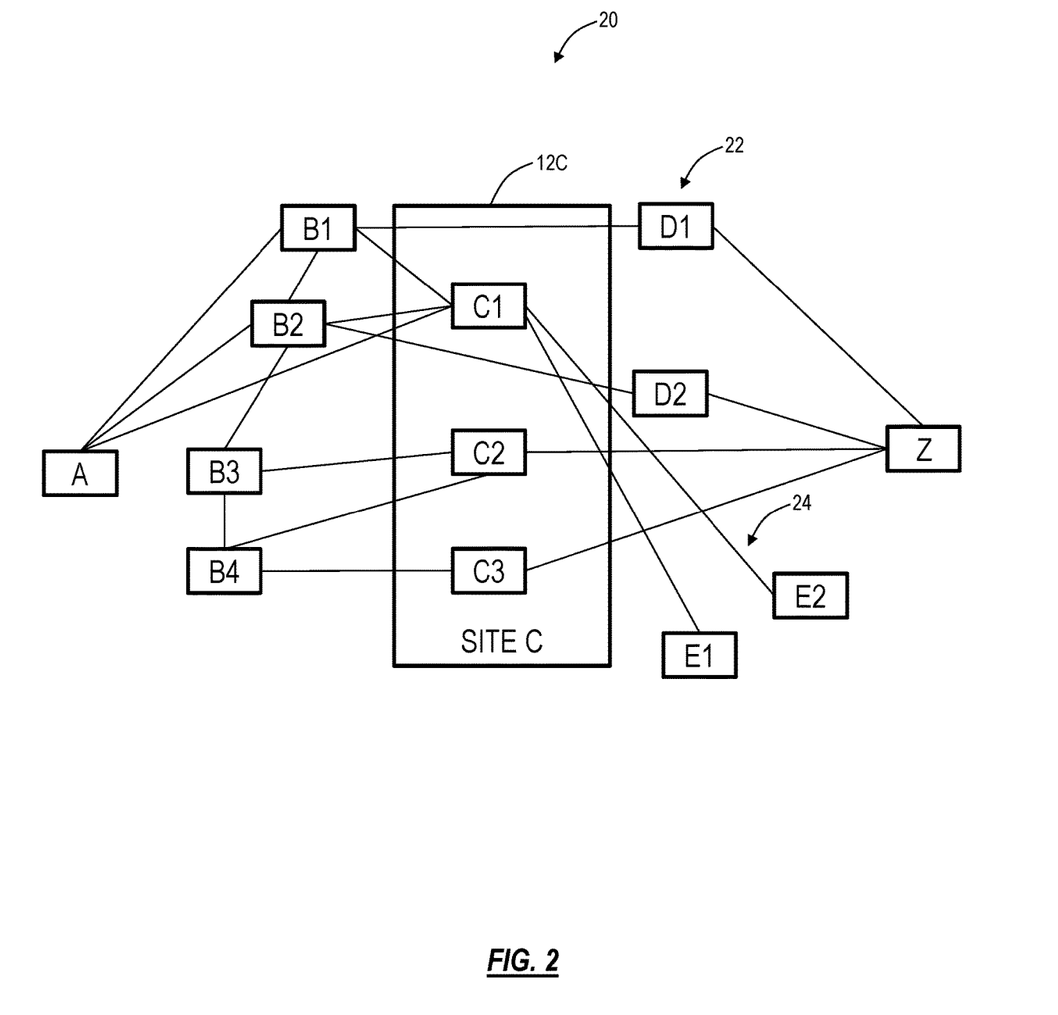
FIG. 2 is a network graph of the network with vertices representing ports at the nodes and edges representing connectivity between the ports.

The PCE 14 can be configured to provide paths in response to requests. In doing so, the PCE 14 can maintain a network graph and use Dijkstra's algorithm and Yen's algorithm. FIG. 1 provides a view of nodal connectivity, but at the site level. For the PCE 14 to compute actual paths at the port level, the network graph is based on ports. FIG. 2 is a network graph 20 of the network 10 with vertices 22 representing ports at the nodes and edges 24 representing connectivity between the ports. Note, there can be some metric associated with each edge used in the path computation to find the constrained shortest path. At the optical layer, the ports are wavelengths that are ultimately multiplexed onto fibers that interconnect between the nodes 12A-12Z. At the higher layers (Layer 1-3, etc.), the ports are logical supporting TDM channels (Layer 1), packet flows (Layer 2), etc. that flow between the nodes 12A-12Z. The present disclosure will use the term port generally to refer to some hardware point where connectivity is realized. A computed path from a source node to a destination node will include a listing of ports from an ingress port on the source node to an egress port on the destination port, along with an ordered listing of all intermediate ports. Those skilled in the art will recognize Dijkstra's algorithm and Yen's algorithm can be used on the network graph 20 to k-shortest paths between nodes, at the port level.

The nodes 12A-12Z can be sites in the network and/or network elements at the sites. That is, the term node is used to denote either a specific network element at a specific site, as well as an entire site. For example, in FIG. 1, the nodes 12A, 12Z are single network elements at the sites A, Z, respectively, i.e., the source node 12A and the destination node 12Z. This makes sense as the source and destination are defined while the intermediate ports, interfaces, network elements, etc. are being determined by the path calculation. Also, it is even possible to define the destination node 12Z in terms of different network elements as well. At the intermediate sites, e.g., sites B, C, D, E, there can be one or more network elements at these sites, and the present disclosure refers to all of the ports or interfaces C1, C2, C3 as part of the node 12C, even if there are multiple network elements. Again, the present disclosure deals with getting multiple vertices at the node 12C, i.e., diversity across different interfaces at either the intermediate nodes, such as the node 12C, as well as even at the destination node 12Z. So, the term nodes can mean one or more network elements at a given site.

Path Computation

A normal Constrained Shortest Path First (CSPF) algorithm, such as based on Dijkstra's algorithm, returns just a path. We can look at multiple paths by using a k-shortest path algorithm (k is an integer greater than one). As implied by the name, the k-shortest algorithm gives the k shortest paths between two nodes, rather than just the one absolute shortest path between them. By definition, a k-shortest CSPF computation will take longer to run than a 1-shortest CSPF computation. For a 1-shortest CSPF, once we find a path from source (S) to destination (D), we know it has to be the shortest, so we are done. For k-shortest, the path computation has to keep going until we find k such paths from S to D. In the meantime, we are exploring a variety of paths and subparts that meander from what our 1-shortest path would be. There have been a number of implementations that have looked at the most efficient way of doing this; here we will look at an adaptation of Yen's algorithm. Yen's algorithm is described in Yen, Jin Y. "Finding the k shortest loopless paths in a network." Management Science 17.11 (1971): 712-716, the contents of which are incorporated by reference.

The following pseudocode is an implementation of Yen's algorithm to find k-shortest paths from a source (S) to destination (D) in a network which is represented by the network graph 20. Note, in the context of the network graph 20 and the following descriptions, node is a vertex which is a port.

```
A[0] = RegularCSPF(Graph, S, D);
if (A[0] == NULL)
  return;
Heap = [ ];
for (k = 1 to K) {
  for (i = 0 to size(A[k-1]) - 2) { // for every node from the
  first to the next to last in the previous path
    spurNode = A[k-1].node(i);
    rootPath = A[k-1].nodes(0,i);
    removeEdges = <for any previous path who also contains
    the root path, add the next node in that path to this set>
    Graph.remove(removeEdges);
    spurPath = RegularCSPF(Graph, spurNode, D);
    if (spurPath == NULL)
      continue;
    totalPath = append(rootPath, spurPath);
    if (Heap.contains(totalPath) == false)
      Heap.add(totalPath);
    Graph.restore(removeEdges);
  }
  if (Heap.empty( ))
    return;
  Heap.sort( );
  A[k] = Heap.pop( );
}
```

Yen's algorithm uses two lists, i.e., list A (A[0] to A[k] in the above) (permanent shortest paths from source to destination—chronologically ordered) and a second list denoted as a heap (tentative/candidate shortest paths). At first you have to find the 1st shortest path from the source to destination using any well-suited shortest path algorithm (e.g., Dijkstra). Then the Yen algorithm exploits the idea that the k-th shortest paths may share edges and sub-paths (path from source to any intermediary nodes within the route) from (k–1)-th shortest path. Then you have to take (k–1)th shortest path and make each node in the route unreachable in turn, i.e., rub off particular edge that goes to the node within the route. Once the node is unreachable, find the shortest path from the preceding node to the destination. Then you have a new route which is created by appending the common sub-path (from source to the preceding node of the unreachable node) and adds the new shortest path from preceding node to destination. This route is then added to the heap, provided that it has not appeared in list A or the heap before. After repeating this for all nodes in the route, you have to find the shortest route in heap and move that to list A. This is repeated until there are k paths in the list A.

Also, a very simplified explanation would be that we start with the 1-shortest path, and then for subsequent paths we try to find ways to divert off of paths we have found thus far, by examining at nodes along the way of the most recent path and eliminating paths we have already taken out of those nodes from contention, to make sure what we find at that point is something new. Note that this algorithm still makes use of the 1-shortest algorithm, both to find the 0th path and to find paths from the spur node to D when we are trying to find diversions. A spur node and spur path are as defined in Yen's algorithm, namely a node from which there is a diversion and a path for the diversion, from a root path.

Motivation

Again, the network graph 20 and the vertices (nodes) are based on ports. There are cases where a path request is based on network elements or a site. In such cases, if the result comes out to be using a single port in the network element for most or all of the k-paths, it is not desirable, and the user is interested in options with diverse ports being selected for k-path options. That is, based on the inherent functionality of Yen's algorithm, it was determined that, when there are site inclusions, e.g., must include the node 12C in the k-shortest paths between the node 12A and the node 12Z, and when the network graph 20 is based on ports, the k-shortest path results tend to come back with most paths having the same port at the site inclusion. This is the case even though the node 12C has multiple ports (e.g., C1, C2, C3, etc.).

The following provide examples using the network graph 20 in FIG. 2, where each edge has an equal weight of 1. Note, after that, we present some examples in a denser graph with variable weights on the edges. Of course, those skilled in the art will recognize these network graphs 20 are for a very simplified network in terms of ports, network elements, and sites, for ease of illustration, and practical embodiments will typically be significantly larger in the corresponding network graph, i.e., significantly more edges and vertices.

Figure 3:
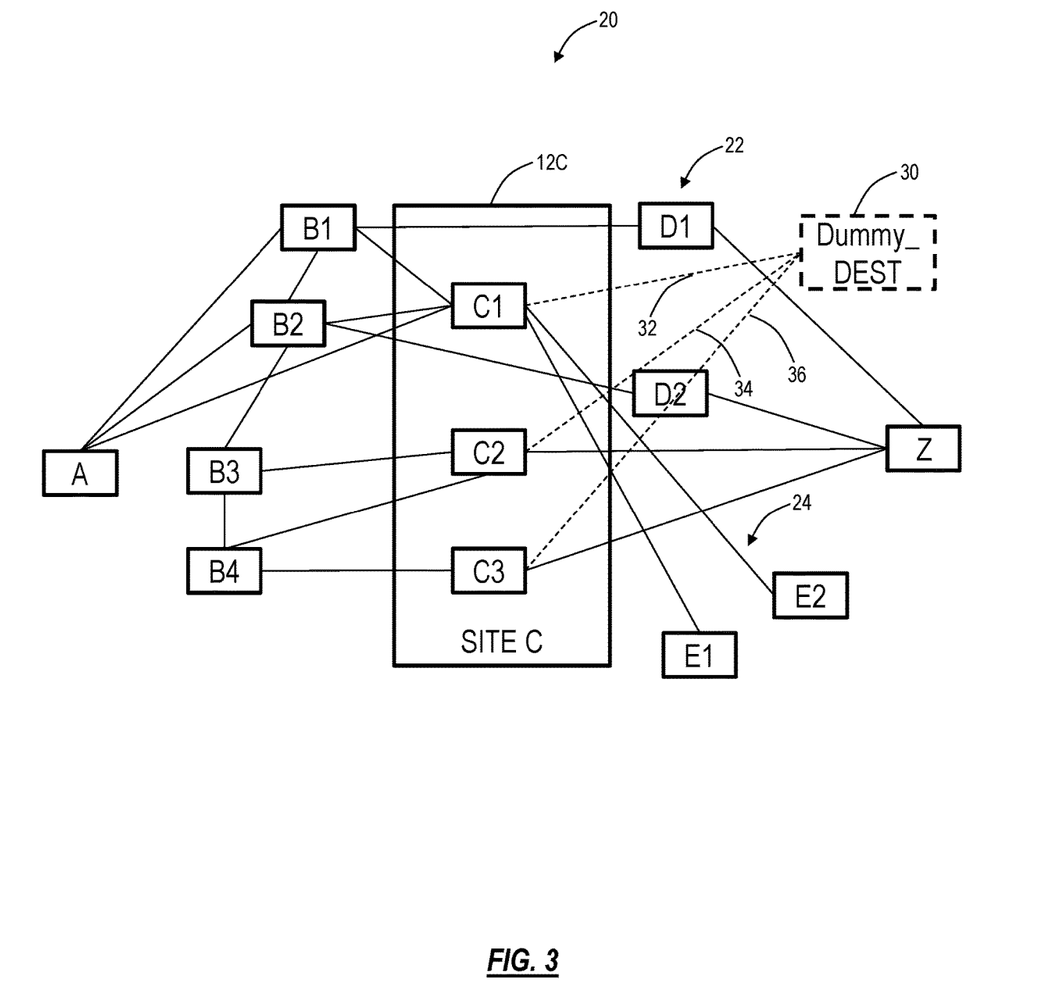
FIG. 3 is the network graph of FIG. 2 with the addition of a dummy destination vertex connected to all of the ports at the node C.

For example, to illustrate the motivation, in FIG. 2, assume we want to find 3 paths from vertex A to the node 12C, as part of a path from the vertex A to the vertex Z. Specifically, the node 12C is an ordered inclusion in a path request from the node 12A to the node 12Z, with a request for 3 paths. Of note, the site 12C has three vertices C1, C2, C3. To handle the node 12C as an inclusion constraint, a dummy or virtual vertex can be added in the network graph 20 to ensure the inclusion constraint is met. FIG. 3 is the network graph 20 of FIG. 2 with the addition of a dummy destination vertex 30 connected to all of the ports at the node 12C. The dummy destination vertex 30 is not an actual port in the network 10, but rather a virtual construct to ensure all paths go through the node 12C, which is the inclusion constraint.

With the current implementation of Yen's algorithm and the dummy destination vertex 30, the 3 computed paths would be A-B1-C1, A-B2-C1, A-B11-B2-C1, which all are on C1. A more detailed explanation follows. Assume the network graph 20 is a weighted graph with each edge having an equal weight (e.g., 1), and Dijkstra's algorithm and Yen's algorithm are used to find K paths between the end points. In this example, we intend to find k paths using Yen's algorithm from the vertex A to the node 12C which means reaching any of the vertex C1, C2, C3 from the vertex A.

If k=4 shortest paths are requested, all will end up on vertex C1 at node 12C, i.e., A-C1, A-B11-C1, A-B2-C1, A-B1-B2-C1 as these 4 are the shortest path to reach from vertex A to the node 12C. State differently, the network graph 20 is purposefully constructed to show clearly that all shortest paths from the vertex A to the node 12C are to the vertex C1. This is not always acceptable to a user as they would like to have some flexibility in k path computations to have unique destination points at the node 12C.

Now, for a path computation from the vertex A to the vertex Z with a site inclusion of the node 12C, for k-paths, for any typical inclusion algorithm this involves finding K' segments from vertex A to any of vertices C1, C2, C3. To achieve this, the dummy destination vertex 30 with edges 32, 34, 36 are created in graph to connect to vertices C1, C2, C3, see FIG. 3. The modified graph in FIG. 3 includes the dummy destination vertex 30 (labeled as Dummy_DEST) with vertex and dummy edges 32, 34, 36 from vertices C1, C2, C3 to the dummy destination vertex 30. Again, we use the term "dummy" to note these are virtual constructs. Yen's algorithm is used to find k' shortest path from the vertex A to the dummy destination vertex 30, and then for each of the partial path found above, discarding the dummy destination vertex 30 and edges k' shortest path is requested from each of the Cx vertex (the last end point of the partial path) to Z. At the end, all the of partial paths are combined to return k-shortest paths from vertex A to vertex Z, all of which will include the node 12C due to the dummy destination vertex 30.

That is, the use of the dummy destination vertex 30 for site inclusions means we break the path computation into two parts and combine the result. In this example, we compute from the vertex A to the node 12C with the dummy destination vertex 30, and then from then from the vertex found in the node 12C to the vertex Z. The result is then combined. Now, for illustration purposes, the vertex C1 intentionally has no connectivity to the vertex Z. Thus, any path computation requiring the node 12C as a site inclusion would not return a valid path.

For more details, e.g., with k as 2 and k' (max segments to each included point) as 3 in FIG. 3 with the node 12C as an inclusion constraint, the flow would be as follows:
(1) Find 3 (k') shortest paths from vertex A to dummy destination vertex 30 using Yen's algorithm which in turn uses multiple Dijkstra algorithm calls.
(2) The segments found from step (1) would be A-C1-DUMY_DEST, A-B1-C1-DUMY-DEST, A-B11-B2-C1-DUMMY_DEST because these two are the shortest paths.

(3) Now removing the dummy destination vertex 30 and edges the segment would be A-B1-C1, A-B2-C1.
(4) From C1 find 2 shortest paths to destination Z.
(5) But there's no path between C1 to Z so this would fail to find path from A to Z by including node 12C. If we had found a segment to vertices C2, C3 then we could have successfully found path from C2/C3-Z hence from A-Z valid paths have been returned via C2/C3.

Similarly, if three shortest paths were requested from vertex A to vertex E1 with the node 12C as an inclusion constraint, which is solved by breaking the problem into two parts, computing path from A-C and the from C-E1, would result in similar problem that all paths are resulted through port C1, and maybe the path through C1 is not even valid in some post processing logic. This means that we need to find diverse options for the node 12C, so that even if a particular vertex is not valid, we have other options in the list as well.

Conventional Approach

A solution can include an enumerative approach—find all possible paths and then pick the diverse endpoint paths. This has large time and space complexity (e.g., the heap in Yen's algorithm will grow). Dijkstra's algorithm can compute single shortest path from 1 to many vertices in a single run, but there are 2 issues:

(1) Generally, the network or PCE graph in our domain have lot of validation constraints all of which are not solved in pre-compute, there are lot of cases when certain edges of the path are not compatible with each other, this results in lot of invalid paths and Dijkstra's algorithm, cannot be used, even to compute a single shortest path we need to have Yen's algorithm.

(2) In the case of 1 . . . n Dijkstra's algorithm, we will just get single path from 1 source to each of n destinations but there are cases where we still need to compute more than 1 path to a destination because the k-path requirement might not get fulfilled with n paths (or less than n because all destinations may not have a path).

Because many paths will fail to satisfy this diversity, this approach means path generation runs to large k. This is costly in terms of both time and memory in a way directly follows from k-shortest path. As this is also sensitive to network size, as network size grows the complexity will be more pronounced.

Solution

The present disclosure provides an approach to find diverse endpoints directly, in Yen's algorithm. Specifically, the present disclosure includes a modification of Yen's algorithm with the dummy destination vertex 30 that results in the k-paths having diversity of ports in an included site, by making diversity a priority over cost-based k-shortest paths. Again, as noted above, the conventional approach to Yen's algorithm causes most (or all in our example case) ports to be vertex C1 on the k-shortest paths. This is problematic as the vertex C1 cannot reach the end vertex Z.

The present disclosure involves changing the costs of the edges 32, 34, 36 during successive iterations of Yen's algorithm, i.e., namely adding an additional step as detailed below. Let's use the same example from above in FIG. 3 where we want to find three paths from the vertex A to the node 12C, such as an intermediate step in a path computation from vertex A to vertex Z with the node 12C as an inclusion constraint. In FIG. 3, assume the network graph 20 is a weighted graph and each edge 24, 32, 34, 36 has a default value, e.g., 1. At an example of computing a path from vertex A to node 12C with port diversity includes:

(1) At first, the dummy destination vertex 30 is created and added in the network graph 20 with the edges 32, 34, 36 connected to all of the vertices C1, C2, C3 associated with the inclusion constraint of the node 12C, so that the problem statement is reduced to calculating the path from the vertex A to the dummy destination vertex 30.

(2) Using Yen's algorithm, the first shortest segment from the vertex A to the dummy destination vertex 30 is computed as A-C1-DUMMY-DEST.

(3) The present disclosure includes adding a new step where after finding one path (e.g., A-C1-DUMMY-DEST), the cost from the vertex C1 to the dummy destination vertex 30 via the edge 32 is increased, such as to some high value (say 1000) so that this edge is considered last in subsequent path computations in Yen's algorithm, thereby focusing on diversity in the vertices found at the inclusion constraint, the node 12C.

Note, we use the term high value to mean something larger than the typical weights on the edges in the weighted graph. For example, here the edges all have a weight of 1, so the high value can be 1000, or even 100, or something at least an order of magnitude more than the typical weight. By assigning this to the high value, the edge to the dummy destination vertex 30 is still considered, but only as a last resort.

(4) Yen's algorithm is continued from thereon, and the second shortest path segment from the vertex A to the dummy destination vertex 30 now would be A-B1-B2-B3-C2-DUMMY-DEST as the cost of this segment would be 4 and segments having the vertex C1 will not be the shortest path any more as the cost will always be 1000+. That is, changing the weight of the edge 32 to the high value ensures we select the vertex C2 instead of C1 for the next shortest path. Stated differently, this example is provided to show that absent the change of weights, all shortest paths will end on the vertex C1. The approach of changing the weights allows diversity in the selection of vertices at the node 12C.

(5) Now, since this second path has a different vertex C2 at the node 12C, we increase the cost of the edge 34 to the high value. At the same time, we leave the edge 32 also at the high value for the next shortest path determination.

(6) The third shortest path segment now would be A-B11-B2-B3-B4-C3-DUMMY-DEST as any other segments going via the vertices C1, C2 will have now weight of 1000+.

And this can continue. Of note, each time a path is found to a specific vertex at the node 12C, a corresponding weight of its edge to the dummy destination vertex 30 is increased to the high value. As such, the successive iterations can still determine paths to the specific vertex, but they will have high costs. In this simple example, there are three vertices C1, C2, C3 at the node 12C, so all of the resulting k-shortest paths to the node 12C will be diversified across all of the vertices C1, C2, C3. After the third shortest path, the edge 36 will also be assigned the high value for its weight, such that all three edges 32, 34, 36 will have the high value. Subsequent path computations for the fourth path and beyond will now treat the vertices C1, C2, C3 the same (all have the high value to the dummy destination vertex 30). As such, the fourth path and subsequent paths will tend to land on the vertex C1, based on it clearly being the shortest path in this example.

However, when returning all of the k-shortest paths, we will have some that end at the vertices C2, C3. This is important in this example since there is no path from the vertex C1 to the vertex Z. So, in the next step to determine a path from the site inclusion of node 12C to the vertex Z, all of the paths with the vertex C1 can be discarded.

Continuing this example, now we have three segments from the vertex A to the node 12C—A-C1-DUMMY_DEST, A-B1-B2-B3-C2-DUMMY_DEST, A-B1-B2-B3-B4-C3-DUMMY_DEST. To continue to the vertex Z, the dummy destination vertex 30 and the edges 32, 34, 36 are removed from the network graph 20, and our modified segments are A-C1, A-B1-B2-B3-C2, A-B1-B2-B3-B4-C3. Now when we find segments from each of the vertices C1, C2, C3 to the vertex Z, there is not a path from C1-Z but from C2-Z and C3-Z we will have the path. The segments found at the point would be C2-Z, C3-Z. Combining the segments found so far there will be two shortest paths from A-Z that would be A-B1-B2-B3-C2-Z, A-B1-B2-B3-B4-C3-Z. Thus, this approach yields a valid path from the vertex A to the vertex Z, with an inclusion constraint of the node 12C.

Note, the algorithm is changing the cost of the last edge 32, 34, 36 only to the dummy destination vertex 30. In Yen's algorithm, already computed paths are preserved in an A array (often called a root path), and a spur path is computed from sub-paths of root path, and changing the cost of any edge of the path in the A array can cause issue. However, here we are just changing the cost of the last edge 32, 34, 36 which is connected to the dummy destination vertex 30 which can never become a root path of subsequent paths, so this change of cost of the last edge is safe from the overall algorithm perspective. That is, we will never explore any further paths with the edges 32, 34, 36 because these are only virtual constructs used to ensure we get the vertices C1, C2, C3 because there are associated with the inclusion constraint of node 12C.

Thus, the approach described herein provides an extension to Yen's k-shortest path algorithm to support k-shortest paths with priority to endpoint diversity over default cost-based k-shortest paths. This is not limited to destination endpoint but also takes care of a scenario when multiple graph vertices are part of an inclusion constraint with a OR operator, which means that pick any one or more of the graph vertices provided in inclusion constraint. In that case, this algorithm will result in paths spanning through different vertices of the inclusion list. That is, one use case is an inclusion constraint of a site, i.e., the node 12C, which includes multiple vertices C1, C2, C3 (i.e., physical network ports). Other use cases are also contemplated, namely a graph having multiple inclusion constraints (vertices) with an or operator. The formal definition can be to provide a path from vertex A to vertex Z and include any of vertices C1, C2, C3. With the present disclosure, we will get k-shortest paths which prioritize diversity of the vertices C1, C2, C3 over the shortest path which we find tends to favor only one vertex (C1 in our example).

Another Example with a Weighted Graph Having Variable Weights

Figure 4:
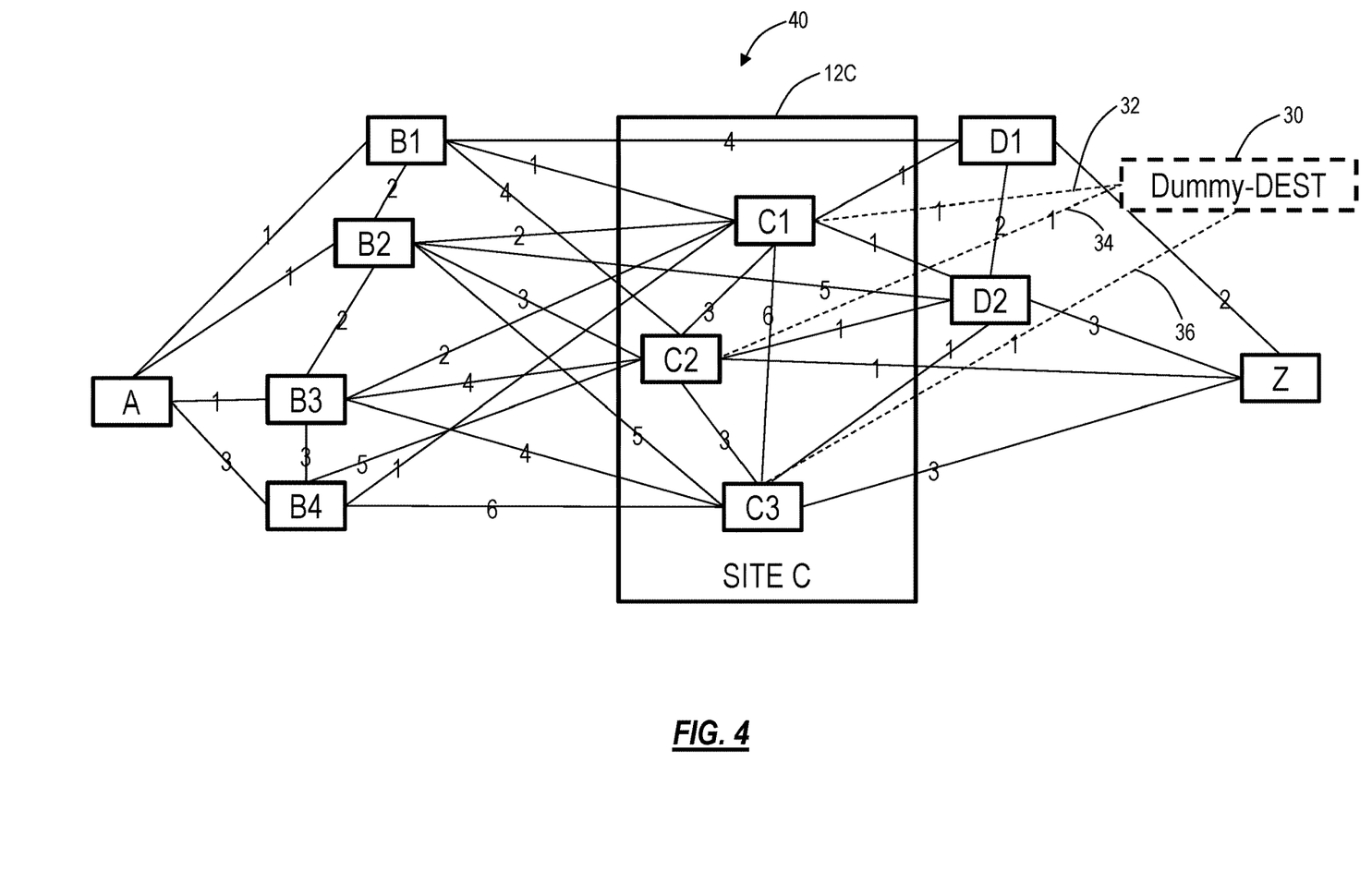
FIG. 4 is a network graph of another example network with vertices representing ports at the nodes and edges representing connectivity between the ports, with varying edge costs.

FIG. 4 is a network graph 40 of another example network with vertices representing ports at the nodes and edges representing connectivity between the ports, with varying edge costs. The network graph 40 is a weighted graph with varying edge cost, versus the network graph 20 which had each edge being the same weight. This is generally the case in real networks. Again, assume a user intends to find k paths using Yen's algorithm from the vertex A to the node 12C, which means reaching any of the vertex C1, C2, C3 from the vertex A. In this case, the dummy destination vertex 30 is created connecting all applicable vertices C1, C2, C2 of the node 12C, each dummy edge 32, 34, 36 has a weight of 1.

In the above case if k=3, the shortest paths from the vertex the dummy destination vertex 30 would be
(1) A-B1-C1-Dummy-DEST(cost=3),
(2) A-B2-C1-Dummy-DEST (cost=4),
(3) A-B3-C1-Dummy-Dest (Cost=4)
Discarding the Dummy-DEST path found would be:
(1) A-B1-C1-(cost=2),
(2) A-B2-C1 (cost=3),
(3) A-B3-C1 (Cost=3)

All the paths end up on the vertex C1 only as paths to vertices C2, C3 from the vertex A are of higher cost. Again, this is not always acceptable to customers as they would like to have some flexibility in k path computations to have diverse destination points in a site for each path.

Now, again, assume the objective is to find k paths from the vertex A to the vertex Z. In the network graph 40, if the user intends to find k paths from the vertex A to the vertex Z via the node 12C which means traversing through any of the vertices C1, C2, C3 to reach vertex Z.

For any typical inclusion algorithm this involves finding k' segments from the vertex A to any of the vertices C1, C2, C3. To achieve this, the dummy destination vertex 30 with edges 32, 34, 36 are created in the graph 40 to connect to the vertices C1, C2, C3. k' paths are calculated from the vertex A to the dummy destination vertex 30, and, for each of the paths found, after discarding dummy edge/vertex, k' paths are calculated from destination to vertex Z.

With the present disclosure, to find a path from the vertex A to the vertex Z with the node 12C as an inclusion constraint, with k=3, the flow would be as follows. Also, when multiple paths have the same cost, any of the paths is chosen as shortest path which is deterministic and the same is not related to this solution, here focus is the diverse end point aspect of shortest paths found using Yen's algorithm.

(1) Find k'=3 segments from the vertex A to the dummy destination vertex 30.
  (a) the first shortest path segment from A to the dummy destination vertex 30 is A-B1-C1-Dummy-DEST (Cost=3)
  (b) Increase the cost of the edge 32 to 1000 (any higher value), i.e., since the edge 32 connects the dummy destination vertex 30 to the vertex C1.
  (c) the second shortest path segment would be A-B2-C2-Dummy-DEST (Cost=5) as all paths through vertex C1 would now have cost of 1000+.
  (d) Increase cost of the edge 32 to 1000 (any higher value), i.e., since the edge 34 connects the dummy destination vertex 30 to the vertex C2.
  (e) the third shortest path segment would be A-B3-C3-Dummy-DEST (Cost=6) as all shortest paths through the vertices C1, C2 will have cost of 1000+.
  (f) Segments found so far are A-B1-C1-Dummy-DEST, A-B2-C2-Dummy-DEST, A-B3-C3-Dummy-DEST.
(2) Excluding the dummy destination vertex 30 and the edges 32, 34, 36 the modified segments would be A-B1-C1 (Cost=2), A-B2-C2 (Cost=4), A-B3-C3 (Cost=5)
(3) Now find segments (k'=3) from each of the vertices C1, C2, C3 to the destination vertex Z. The shortest segments found would be
  (i) C1-D1-Z (Cost=3), C1-D2-Z (Cost=4), C1-D2-C3-Z (Cost=5)
  (ii) C2-Z (Cost=1), C2-D2-Z (Cost=4), C2-D2-D1-Z (Cost=5)

(iii) C3-Z (Cost=3), C3-C2-Z (Cost=4), C3-D2-Z (Cost=4)

(4) Combining segments found from step (2) and step (3), the three k-shortest paths would be (i) A-B2-C2-Z (Cost=5), (ii) A-B1-C1-D1-Z (Cost=5), (iii) A-B1-C1-D2-Z (Cost=6)

This approach picks diverse vertices in the site inclusion, the node 12C. Advantageously, this reduces the risk of not finding a path from the intermediate vertex to the destination due to the increased diversity in the intermediate included site vertices.

Process

Figure 5:
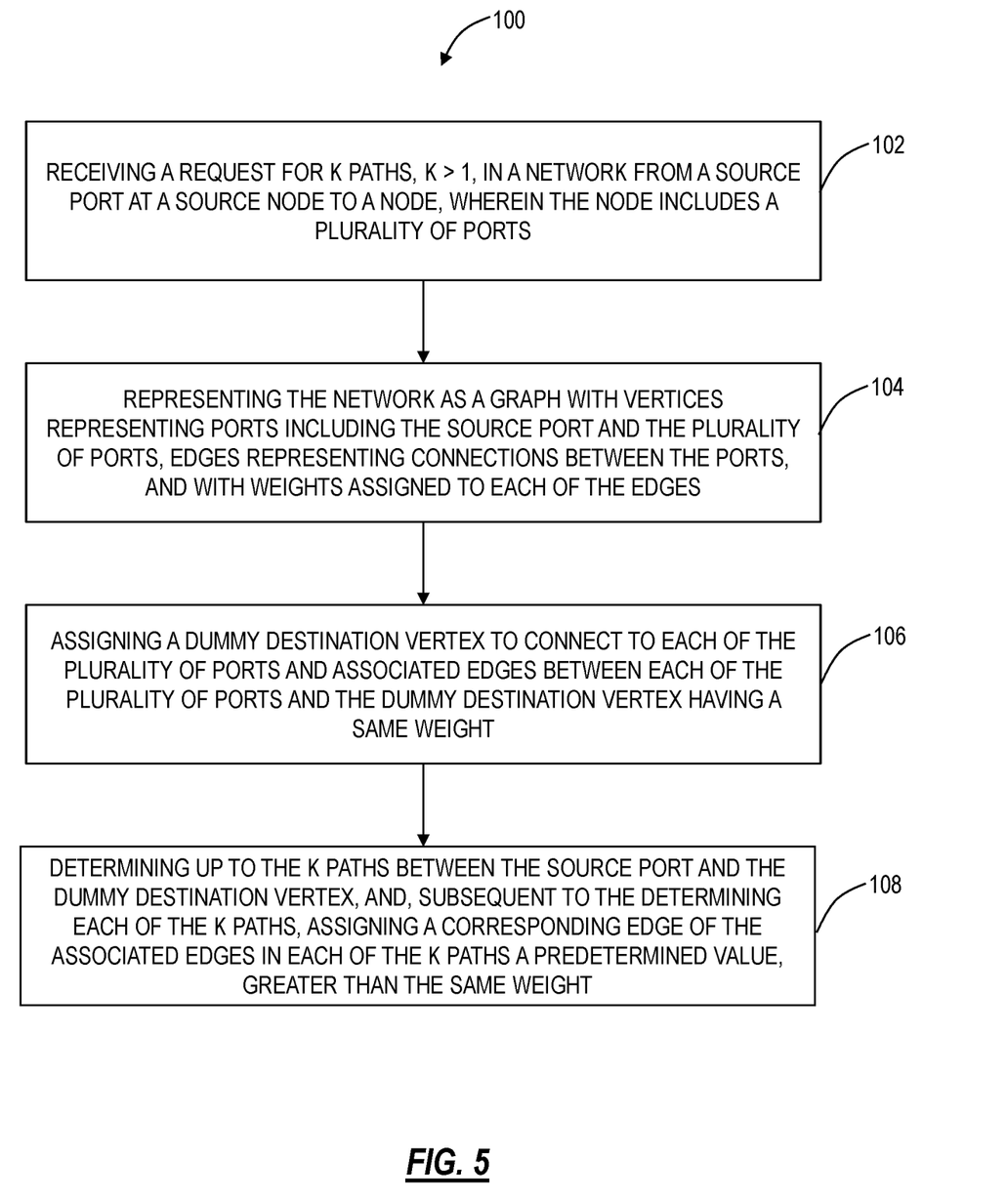
FIG. 5 is a flowchart of a process for diversifying k-shortest path computation results for multiple vertices as destination or as inclusion constraint.

FIG. 5 is a flowchart of a process 100 for diversifying k-shortest path computation results for multiple vertices as destination or as inclusion constraint. The process 100 contemplates implementation as a method having steps, via a processing device 200 (see FIG. 6) configured to implement the steps, via the PCE 14 configured to implement the steps, and as a non-transitory computer-readable medium storing instructions that, when executed, cause one or more processors to implement the steps.

The steps include receiving a request for k paths, k>1, in a network from a source port at a source node to a node, wherein the node includes a plurality of ports (step 102); representing the network as a graph with vertices representing ports including the source port and the plurality of ports, edges representing connections between the ports, and with weights assigned to each of the edges (step 104); assigning a dummy destination vertex to connect to each of the plurality of ports and associated edges between each of the plurality of ports and the dummy destination vertex having a same weight (step 106); and determining up to the k paths between the source port and the dummy destination vertex, and, subsequent to the determining each of the k paths, assigning a corresponding edge of the associated edges in each of the k paths a predetermined value, greater than the same weight (step 108).

Again, the dummy destination vertex and the associated edges are virtual constructs that do not actually correlate to any physical ports or connections in the network. Rather, these are used to ensure the path is computed to any of the plurality of ports, as an inclusion constraint. In the network application, the inclusion constraint is a site, i.e., the node 12C, and the plurality of ports are the vertices C1, C2, C3. The process 100 can include removing the dummy destination vertex and the associated edges from the k paths to form k shortest paths having diversity across the plurality of ports at the destination node; and providing the k shortest paths in response to the request.

In an embodiment, the node is an intermediate node that is an inclusion constraint and the request further includes a destination port at a destination node, and wherein the process 100 can further include determining k paths from associated ports of the plurality of ports at the intermediate node to the destination port; and returning k shortest paths based on the k paths between the source port and the intermediate node and the k paths from associated ports of the plurality of ports at the intermediate node to the destination port. In another embodiment, the node is a destination node, such that the k paths include diversity across the plurality of ports at the destination node. The predetermined value can be at least an order of magnitude greater than the weights. That is, the predetermined value can be some arbitrary value, as long as it is high enough to bias against the already chosen vertices for the plurality of ports. That is, we want diversity in the plurality of ports in the k paths.

The determining can utilize Yen's algorithm. In an embodiment, the network is an optical network, and the ports represent wavelength connections. In another embodiment, the network operates at one or more of Layers 1, 2, and 3, and the ports represent either Time Division Multiplexing (TDM) or packet connections. The process 100 can be implemented in a Path Computation Engine (PCE).

Example Processing Device

Figure 6:
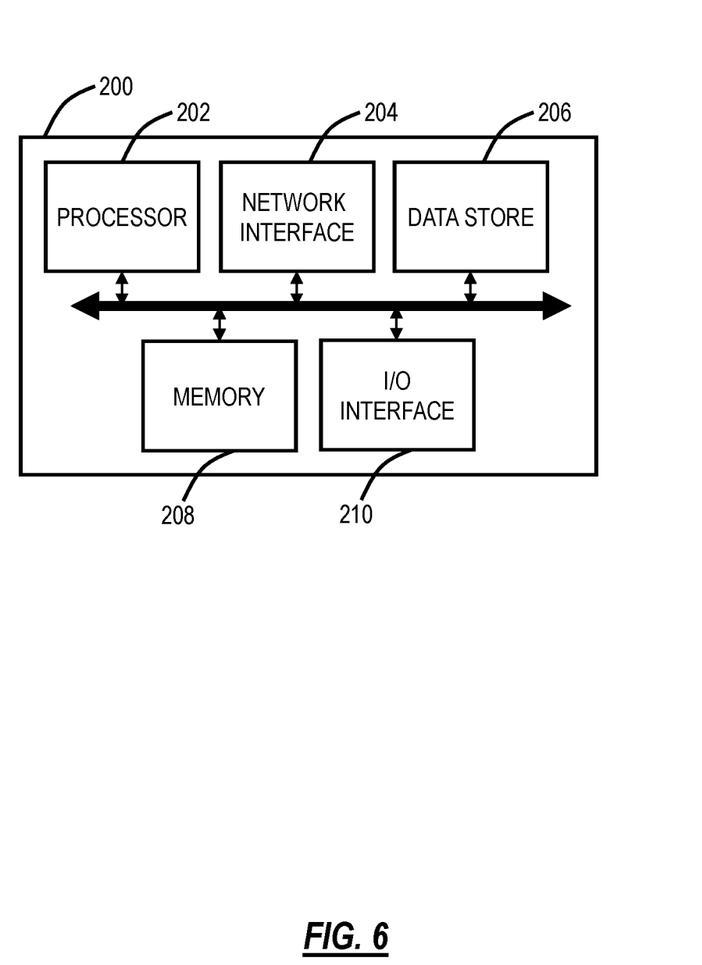
FIG. 6 is a block diagram of an example processing device, such as for implementing a PCE.

FIG. 6 is a block diagram of an example processing device 200, such as for the PCE 14. The processing device 200 can be part of a network element, or a stand-alone device communicatively coupled to the network element, such as the PCE 14, etc. Also, the processing device 200 can be referred to in implementations as a control module, a shelf controller, a shelf processor, a system controller, etc. The processing device 200 can include a processor 202 which is a hardware device for executing software instructions. The processor 202 can be any custom made or commercially available processor, a central processing unit (CPU), an auxiliary processor among several processors associated with the processing device 200, a semiconductor-based microprocessor (in the form of a microchip or chip-set), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network, such as to communicate to a management system, or the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof.

Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

Note, while the various descriptions relate to the processing device 200 and the PCE 14, those skilled in the art will appreciate a PCE can be located in an SDN controller, in-skin (within) a network element, hosted in the cloud, in a management system, and the like. Also, the present disclosure is not limited to being implemented in the PCE 14, rather any device can perform the various functions described herein.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including software and/or firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," "a circuit configured to," "one or more circuits configured to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. A non-transitory computer-readable medium comprising instructions that, when executed, cause one or more processors to implement steps of:
    receiving a request for k paths, k>1, in a network from a source port at a source node to a node, wherein the node includes a plurality of ports;
    representing the network as a graph with vertices representing ports including the source port and the plurality of ports, edges representing connections between the ports, and with weights assigned to each of the edges;
    assigning a dummy destination vertex to connect to each of the plurality of ports and associated edges between each of the plurality of ports and the dummy destination vertex having a same weight; and
    determining up to the k paths between the source port and the dummy destination vertex, and, subsequent to the determining each of the k paths, assigning a corresponding edge of the associated edges in each of the k paths a predetermined value, greater than the same weight, wherein the predetermined value is set such that subsequent paths are biased toward different ones of the plurality of ports to ensure diversity across the plurality of ports at the node.

2. The non-transitory computer-readable medium of claim 1, wherein the steps further include
    removing the dummy destination vertex and the associated edges from the k paths to form k shortest paths having diversity across the plurality of ports at a destination node; and
    providing the k shortest paths in response to the request.

3. The non-transitory computer-readable medium of claim 1, wherein the node is an intermediate node that is an inclusion constraint and the request further includes a destination port at a destination node, and wherein the steps include
    determining k paths from associated ports of the plurality of ports at the intermediate node to the destination port; and
    returning k shortest paths based on the k paths between the source port and the intermediate node and the k paths from associated ports of the plurality of ports at the intermediate node to the destination port.

4. The non-transitory computer-readable medium of claim 1, wherein the node is a destination node, such that the k paths include diversity across the plurality of ports at the destination node.

5. The non-transitory computer-readable medium of claim 1, wherein the predetermined value is at least an order of magnitude greater than the weights.

6. The non-transitory computer-readable medium of claim 1, wherein the determining utilizes Yen's algorithm.

7. The non-transitory computer-readable medium of claim 1, wherein the network is an optical network, and the ports represent wavelength connections.

8. The non-transitory computer-readable medium of claim 1, wherein the network operates at one or more of Layers 1, 2, and 3, and the ports represent either Time Division Multiplexing (TDM) or packet connections.

9. The non-transitory computer-readable medium of claim 1, wherein the one or more processors are in a Path Computation Engine (PCE).

10. A method comprising steps of:
receiving a request for k paths, k>1, in a network from a source port at a source node to a node, wherein the node includes a plurality of ports;
representing the network as a graph with vertices representing ports including the source port and the plurality of ports, edges representing connections between the ports, and with weights assigned to each of the edges;
assigning a dummy destination vertex to connect to each of the plurality of ports and associated edges between each of the plurality of ports and the dummy destination vertex having a same weight; and
determining up to the k paths between the source port and the dummy destination vertex, and, subsequent to the determining each of the k paths, assigning a corresponding edge of the associated edges in each of the k paths a predetermined value, greater than the same weight, wherein the predetermined value is set such that subsequent paths are biased toward different ones of the plurality of ports to ensure diversity across the plurality of ports at the node.

11. The method of claim 10, wherein the steps further include
removing the dummy destination vertex and the associated edges from the k paths to form k shortest paths having diversity across the plurality of ports at a destination node; and
providing the k shortest paths in response to the request.

12. The method of claim 10, wherein the node is an intermediate node that is an inclusion constraint and the request further includes a destination port at a destination node, and wherein the steps include
determining k paths from associated ports of the plurality of ports at the intermediate node to the destination port; and
returning k shortest paths based on the k paths between the source port and the intermediate node and the k paths from associated ports of the plurality of ports at the intermediate node to the destination port.

13. The method of claim 10, wherein the node is a destination node, such that the k paths include diversity across the plurality of ports at the destination node.

14. The method of claim 10, wherein the predetermined value is at least an order of magnitude greater than the weights.

15. The method of claim 10, wherein the determining utilizes Yen's algorithm.

16. The method of claim 10, wherein the network is an optical network, and the ports represent wavelength connections.

17. The method of claim 10, wherein the network operates at one or more of Layers 1, 2, and 3, and the ports represent either Time Division Multiplexing (TDM) or packet connections.

18. The method of claim 10, wherein the method is implemented in a Path Computation Engine (PCE).

19. A system comprising:
one or more processors; and
memory storing instructions that, when executed, cause the one or more processors to
receive a request for k paths, k>1, in a network from a source port at a source node to a node, wherein the node includes a plurality of ports,
represent the network as a graph with vertices representing ports including the source port and the plurality of ports, edges representing connections between the ports, and with weights assigned to each of the edges,
assign a dummy destination vertex to connect to each of the plurality of ports and associated edges between each of the plurality of ports and the dummy destination vertex having a same weight, and
determine up to the k paths between the source port and the dummy destination vertex, and, subsequent to the each of the k paths being determined, assigning a corresponding edge of the associated edges in each of the k paths a predetermined value, greater than the same weight, wherein the predetermined value is set such that subsequent paths are biased toward different ones of the plurality of ports to ensure diversity across the plurality of ports at the node.

20. The system of claim 19, wherein the instructions that, when executed, further cause the one or more processors to
remove the dummy destination vertex and the associated edges from the k paths to form k shortest paths having diversity across the plurality of ports at a destination node, and
provide the k shortest paths in response to the request.

* * * * *